United States Patent
Sumiya et al.

(10) Patent No.: US 6,667,133 B1
(45) Date of Patent: Dec. 23, 2003

(54) GELATING AGENT FOR ALKALINE CELL AND ALKALINE CELL

(75) Inventors: Takashi Sumiya, Kyoto (JP); Masami Koike, Kyoto (JP); Yukio Zenitani, Kyoto (JP)

(73) Assignee: Sanyo Chemical Industries, Ltd., Kyoto (JP)

( * ) Notice: Subject to any disclaimer, the term of this patent is extended or adjusted under 35 U.S.C. 154(b) by 0 days.

(21) Appl. No.: 09/913,102

(22) PCT Filed: Feb. 16, 2000

(86) PCT No.: PCT/JP00/00878

§ 371 (c)(1), (2), (4) Date: Aug. 9, 2001

(87) PCT Pub. No.: WO00/49670

PCT Pub. Date: Aug. 24, 2000

(30) Foreign Application Priority Data

Feb. 17, 1999 (JP) .............................................. 11-38750
Dec. 24, 1999 (JP) ........................................... 11-366127

(51) Int. Cl.⁷ ................................................. H01M 6/14
(52) U.S. Cl. ........................ 429/303; 429/300; 429/215; 429/217; 429/229; 429/206; 429/207; 429/248; 429/59
(58) Field of Search .......................... 526/319; 524/556, 524/562; 429/57, 59, 133, 134, 300, 303, 215, 217, 229, 248, 206, 207

(56) References Cited

U.S. PATENT DOCUMENTS

| | | | | |
|---|---|---|---|---|
| 3,871,918 A | * | 3/1975 | Viescou | 429/303 |
| 4,703,067 A | * | 10/1987 | Mikita et al. | 521/63 |
| 4,795,762 A | * | 1/1989 | Diamantoglou et al. | 521/84.1 |
| 4,963,447 A | * | 10/1990 | Nishimura et al. | 429/206 |
| 5,162,417 A | * | 11/1992 | Chuang et al. | 524/401 |
| 5,663,258 A | * | 9/1997 | Zhong et al. | 526/264 |
| 5,686,204 A | * | 11/1997 | Bennett et al. | 429/217 |
| 5,853,914 A | * | 12/1998 | Kawakami | 429/66 |
| 5,888,666 A | * | 3/1999 | Kawakami | 429/62 |
| 6,040,088 A | * | 3/2000 | Bennett et al. | 429/229 |
| 6,165,642 A | * | 12/2000 | Kawakami et al. | 429/218.1 |
| 6,280,877 B1 | * | 8/2001 | Urry | 429/217 |

FOREIGN PATENT DOCUMENTS

| | | |
|---|---|---|
| JP | 02-119053 | 5/1990 |
| JP | 03-089458 | 4/1991 |
| JP | 10-050303 | 2/1998 |

* cited by examiner

*Primary Examiner*—Bruce F. Bell
(74) *Attorney, Agent, or Firm*—Baker & Daniels

(57) ABSTRACT

A gelating agent for an alkaline cell is a cross-linked polymer (A) comprising (meth)acrylic acid and/or its alkali metal salt as a main constituent monomer unit and obtained by an aqueous solution polymerization or a reversed phase suspension polymerization and satisfies the following required conditions (1), (2). The gelating agent has good draining property, satisfactorily high speed charging property of the alkaline electrolytic solution and is therefore effective to produce cells with little unevenness of the charging amount of the electrolytic solution and having uniform quality by mass production and an alkaline cell using the gelating agent is provided with durable discharge time and remarkably excellent impact resistance for a long duration. The said required conditions are required condition (1); that the gelating agent contains 50% by weight or more of a particle whose swollen particle size becomes 300 to 4,000 μm when the gelating agent is swollen in an aqueous potassium hydroxide solution of 40% by weight concentration and required condition (2); that the aqueous potassium hydroxide solution of 40% by weight concentration containing 3% by weight of the gelating agent has 0 to 20 mm stringiness.

19 Claims, 1 Drawing Sheet

GELATING AGENT FOR ALKALINE CELL AND ALKALINE CELL

TECHNICAL FIELD

The present invention relates to a gelating agent for an alkaline cell and an alkaline cell. More particularly, the present invention relates to a gelating agent of a gel type anode for an alkaline cell comprising the anode containing an alkaline electrolytic solution and a zinc powder as a mainly component and using the gelating agent and also to an alkaline cell using the gelating agent.

PRIOR ART

Conventionally, mainly used for an anode of an alkaline cell is a mixture containing an alkaline electrolytic solution in a high concentration (an aqueous high concentration potassium hydroxide solution, if necessary, containing zinc oxide) and a zinc powder and/or a zinc alloy powder and for the purpose of preventing the precipitation of the zinc powder in the alkaline electrolytic solution, an anode proposed as the gelating agent are water-absorptive resin materials with relatively large particle size and comprising poly(meth)acrylic acids and their salts made insoluble by cross-linking agents [(i) Japanese Patent No. 8-28216, (ii) Japanese Patent No. 8-12775, (iii) Japanese Patent Laid-Open No. 10-50303, and the like).

However, these gelating agents are not necessarily satisfactory in prevention of precipitation of a zinc powder, liquid leakage from a cell, and drain of gelating agents, in productivity of cells, and the like.

SUMMARY OF THE INVENTION

Inventors of the present invention have enthusiastically made investigations taking the above described situation into consideration and surprisingly found that gelating agents whose stringiness, particle size and the like are defined within specified ranges have improved properties in the above described disadvantages and provide remarkably desirable results in the discharging property, the life, the impact resistance, the workability, and the like of a cell and thus achieved the present invention.

A first purpose of the present invention is to provide a gelating agent providing remarkably excellent effects on sustainability of electric discharge and impact resistance of an alkaline cell.

A second purpose of the present invention is to provide a gelating agent of an alkaline cell capable of providing an excellent property in stringiness of an alkaline electrolytic solution and dealing with the high speed packing of the alkaline electrolytic solution.

A third purpose of the present invention is to provide a gelating agent of an alkaline cell effective to manufacture a cell with uniform quality with little unevenness in the packed amount of an electrolytic solution even in the case of mass production.

A fourth purpose of the present invention is to provide a gelating agent of an alkaline cell capable of preventing hydrogen gas evolution even if it is brought into contact with a zinc powder in an electrolytic solution and having no probability of causing leakage of an electrolytic solution and damaging a cell attributed to the inner pressure of the cell.

A fifth purpose of the present invention is to provide an alkaline cell using such a gelating agent.

In other words, the present invention provides the following gelating agents [1] to [14] and an alkaline cell [15].

[1] Gelating Agent:

A swelling-in-water type gelating agent of a cross-linked polymer (A) comprising (meth)acrylic acid and/or its alkali metal salt as a main constituent monomer unit and obtained by an aqueous solution polymerization or a reversed phase suspension polymerization, wherein the gelating agent for an alkaline cell satisfies the following required conditions (1), (2):

required condition (1); that the gelating agent contains 50% by weight or more of a particle whose swollen particle size becomes 300 to 4,000 µm when the gelating agent is swollen in an aqueous potassium hydroxide solution of 40% by weight concentration; and required condition (2); that the aqueous potassium hydroxide solution of 40% by weight concentration containing 3% by weight of the gelating agent has 0 to 20 mm stringiness.

[2] Gelating Agent:

A gelating agent for an alkaline cell satisfies the required condition (3) in addition to the foregoing conditions (1), (2):

required condition (3); that the aqueous potassium hydroxide solution of 40% by weight concentration containing 3% by weight of the gelating agent has viscosity of 50 to 1,000 Pa.s at 40° C. after one day and sixty days.

[3] Gelating Agent:

A gelating agent for an alkaline cell satisfies the required condition (4) in addition to the foregoing conditions (1), (2) or (1) to (3):

required condition (4); that the gelating agent contains 0 to 15 ppm of a metal with a lower ionization tendency than zinc.

[4] Gelating Agent:

A gelating agent for an alkaline cell is the gelating agent as defined in [1] containing the swollen particle satisfying the foregoing required condition (1) whose particle size is 500 to 2,000 µm.

[5] Gelating Agent:

A gelating agent for an alkaline cell is the gelating agent as defined in [1] containing 0 to 30% by weight of soluble components in an aqueous potassium hydroxide solution of 10% by weight concentration when the gelating agent is swollen in the said aqueous solution.

[6] Gelating Agent:

A gelating agent for an alkaline cell is the gelating agent as defined in [1], wherein the forgoing polymer (A) is a cross-linked polymer with 5,000 to 1,000,000 average polymerization degree and cross-linked by an allyl ether type cross-linking agent (b) having 2 to 10 of allyl groups in a molecule and added in 0.05 to 1.0% by weight to the total weight of the (meth)acrylic acid and/or its alkali metal salt.

[7] Gelating Agent:

A gelating agent for an alkaline cell is the gelating agent as defined in [6], wherein the forgoing agent (b) has 3 to 10 of allyl groups in a molecule and 1 to 5 of hydroxyl groups in a molecule.

[8] a Gelating Agent:

A swelling-in-water type gelating agent of a cross-linked polymer (A') obtained by cross-linking a polymer which comprises (meth)acrylic acid and/or its alkali metal salt as a main constituent monomer unit, has 5,000 to 1,000,000 average polymerization degree and is produced by an aqueous solution polymerization or a reversed phase suspension polymerization, with an allyl ether type cross-linking agent (b) having 2 to 10 of allyl groups in a molecule and added in 0.05 to 1.0% by weight to the total weight of the (meth)acrylic acid and/or its alkali metal salt, wherein the gelating agent for an alkaline cell satisfies the following required conditions (1) to (4): required condition (1); that the gelating agent contains 50% by weight or more of a particle whose swollen particle size becomes 300 to 4,000 μm when the gelating agent is swollen in an aqueous potassium hydroxide solution of 40% by weight concentration; required condition (2); that the aqueous potassium hydroxide solution of 40% by weight concentration containing 3% by weight of the gelating agent has 0 to 20 mm stringiness; required condition (3); that the aqueous potassium hydroxide solution of 40% by weight concentration containing 3% by weight of the gelating agent has viscosity of 50 to 2,000 Pa.s at 40° C. after one day and sixty days; and required condition (4); that the gelating agent contains 0 to 15 ppm of a metal with a lower ionization tendency than zinc.

[9] Gelating Agent:

A gelating agent for an alkaline cell is the gelating agent as defined in [1], wherein the polymer (A) is obtained by polymerizing a monomer comprising mainly (meth)acrylic acid and/or its alkali metal salt with neutralization degree of 0 to 30% by mole and neutralizing the polymer based on necessity after polymerization.

[10] Gelating Agent:

A gelating agent for an alkaline cell is the gelating agent as defined in [1] obtained by carrying out permeation drying and/or ventilation drying based on necessity after segmentation of water-containing gel in the process of drying the water-containing gel of the polymer (A) or carrying out vacuum drying and/or ventilation drying after solid-liquid separation of the water-containing gel.

[11] Gelating Agent:

A gelating agent for an alkaline cell is the gelating agent as defined in [8] containing the swollen particle satisfying the foregoing required condition (1) whose particle size is 500 to 2,000 μm.

[12] Gelating Agent:

A gelating agent for an alkaline cell is the gelating agent as defined in [8] containing 0 to 30% by weight of soluble components in an aqueous potassium hydroxide solution of 10% by weight concentration when the gelating agent is swollen in the said aqueous solution.

[13] Gelating Agent:

A gelating agent for an alkaline cell is the gelating agent as defined in [8], wherein the polymer (A') is obtained by polymerizing a monomer comprising mainly (meth)acrylic acid and/or its alkali metal salt with neutralization degree of 0 to 30% by mole and neutralizing the polymer based on necessity after polymerization.

[14] Gelating Agent:

A gelating agent for an alkaline cell is the gelating agent as defined in [8] obtained by carrying out permeation drying and/or ventilation drying based on necessity after segmentation of water-containing gel in the process of drying the water-containing gel of the polymer (A') or carrying out vacuum drying and/or ventilation drying after solid-liquid separation of the water-containing gel.

[15] Alkaline Cell:

An alkaline cell using a gelating agent of [1] to [14].

Figure 1:
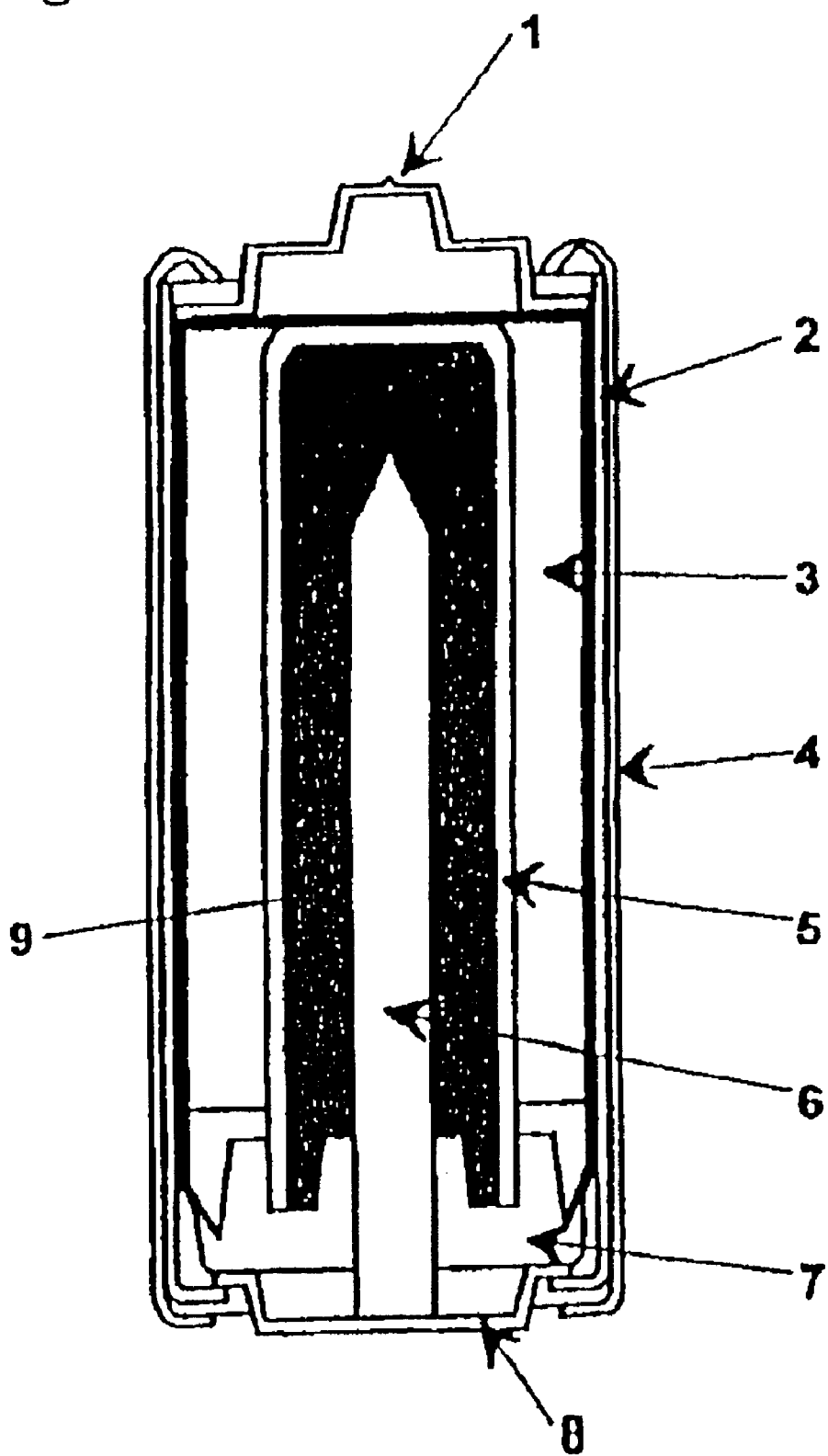
FIG. 1 shows a cross-section figure showing one example of an alkaline cell of the present invention.

The symbols denote as follows:
1 a cathode terminal plate
2 a shrinkage tube
3 a cathode agent ($MnO_2$+carbon)
4 an outer can
5 a separator
6 a current collector rod
7 a gasket
8 an anode terminal plate
9 a gel anode

DETAILED DESCRIPTION OF THE INVENTION

Cross-linked Polymer

In the present invention, the cross-linked polymer (A) to be used as a gelating agent for an alkaline cell is preferable to be obtained by polymerizing mainly (meth)acrylic acid (alkali metal salt) (denoting acrylic acid and/or methacrylic acid and/or their alkali metal salts and hereinafter the same) by an aqueous solution polymerization method or a reversed suspension polymerization method in the presence of an allyl ether type copolymerizable cross-linking agent (b).

In this case, (meth)acrylic acid means acrylic acid and/or methacrylic acid and their metal salts are neutralized acrylic acid and/or methacrylic acid with alkali metals such as potassium, sodium, lithium and the like.

In the present invention, neutralization of (meth)acrylic acid with an alkali metal may be carried out to give incompletely neutralized or neutralized cross-linked polymer (A) since the gelating agent of the present invention is to be used in an aqueous alkaline solution in a high concentration, however it is preferable to be carried out partially or entirely for (meth)acrylic acid for the purpose to lower the viscosity and the dispersibility of the polymer (A) and to improve the workability in production of the polymer (A) and the like.

In the case (meth)acrylic acid is neutralized based on necessity, generally an alkali metal hydroxide such as potassium hydroxide, sodium hydroxide, lithium hydroxide, and the like or their aqueous solutions may be added to (meth)acrylic acid in monomer stage before polymerization or to a water-containing gel after polymerization, however, in the case of using an allyl ether type copolymerizable cross-linking agent (b), which will be described later, the agent is insufficient in water-solubility, so that if polymerization is carried out in high neutralization degree of (meth)acrylic acid, it is sometimes impossible to obtain the cross-linked polymer (A) with defined physical properties even with addition of a prescribed amount of the cross-linking agent (b) attributed to isolation of the cross-linking agent (b) from the aqueous monomer solution and impossibility of the prescribed cross-linking reaction. Hence it is preferable to adjust the neutralization degree by adding an alkali metal hydroxide to a water-containing gel based on necessity after polymerization of (meth)acrylic acid whose neutralization degree is controlled to be 0 to 30% by mole.

The final neutralization degree of (meth)acrylic acid of the gelating agent of the present invention is preferably 30 to 100% and further preferably 50 to 90%.

In the present invention, in the case of production of the cross-linked polymer (A), the aqueous solution polymerization and/or the reversed phase suspension polymerization of mainly polymers of (meth)acrylic acid (alkali metal salts) as monomers is carried out and if necessary, a monoethylenic unsaturated monomer copolymerizable with (meth)acrylic acid (alkali metal salts) may be copolymerized. The monoethylenic unsaturated monomer is not particularly restricted as long as the monomer is polymerizable, and examples are anionic ethylenic unsaturated monomers, e.g. a monomer containing carboxylic acid (salt) group such as maleic acid (alkali metal salt), fumaric acid (alkali metal salt), itaconic acid (alkali metal salt) and the like, a monomer containing sulfonic acid (salt) group such as acrylamide-2-methylpropanesulfonic acid (alkali metal salt), sulfoalkyl (meth)acrylate, stylenesulfonic acid (alkali metal salt) and the like; nonionic water soluble ethylenic unsaturated monomers, e.g. (meth)acrylamide, N-(1-3C)alkyl-substituted (meth)acrylamide, [N-methylacrylamide, N,N-dimethylacrylamide and the like], N-vinylacetamide, monohydroxy(1-3C)alkyl mono(meth)acrylate, polyethylene glycol (polymerization degree: 2 to 100) mono(meth)acrylate, polypropylene glycol (polymerization degree: 2 to 100) mono(meth)acrylate, methoxypolyethylene glycol (polymerization degree: 2 to 100) mono(meth)acrylate, and the like; and other monoethylenic unsaturated monomers such as (1-5C)alkyl (meth)acrylate, vinyl acetate and the like. These ethylenic unsaturated monomers may be used in combination of two or more of them within a prescribed range of the amount.

The additional amount of an ethylenic unsaturated monomer other than these (meth)acrylic acid and/or their alkali metal salts is generally 0 to 50% by weight and preferably 0 to 30% by weight to the weight of the (meth)acrylic acid (alkali metal salt) at the time of polymerization.

In this invention, at the time of production of the polymer (A), in order to lower the stringiness in a high concentration alkaline electrolytic solution and to stabilize the gel in alkaline state, it is preferable to use an allyl ether type copolymerizable cross-linking agent (b) having two or more allyl groups in a molecule.

As the allyl ether type copolymerizable cross-linking agent (b), usable are, for example, cross-linking agents (b1) having two allyl groups and no hydroxy group in a molecule represented by (2-5C) alkyleneglycol diallyl ether, polyethylene glycol diallyl ether (Mw: 100 to 4,000) and the like; cross-linking agents (b2) having two allyl groups and 1 to 5 hydroxy groups in a molecule and represented by glycerol diallyl ether, trimethylolpropane diallyl ether, pentaerythritol diallyl ether, polyglycerol diallyl ether, and the like; cross-linking agents (b3) having 3 to 10 allyl groups and no hydroxy group in a molecule and represented by trimethylolpropane triallyl ether, glycerol triallyl ether, pentaerythritol tetraallyl ether, tetraallyloxyethane and the like; and cross-linking agents (b4) having 3 to 10 allyl groups and 1 to 5 hydroxy groups in a molecule and represented by pentaerythritol triallyl ether, diglycerol triallyl ether, polyglycerol (polymerization degree 3 to 13) polyallyl ether and the like. These allyl ether type cross-linking agents may be used in combination of two or more of them.

Among the allyl ether type cross-linking agents (b), these (b4) are preferable since they have excellent compatibility with acrylic acid and/or alkali metal salts in the aqueous solution polymerization and/or the reversed phase suspension polymerization owing to the possession of 1 to 5 hydroxy groups and 3 to 10 allyl groups, and they are capable of carrying out efficient cross-linking as to cover the low copolymerization property, which is intrinsic property of allyl groups, attributed to the existence of a large number of allyl groups.

In the present invention, although it depends on the types of the cross-linking agents to be used and the average polymerization degree of (meth)acrylic acid (alkali metal salts), the additional amount of the agent (b) is generally 0.05 to 2% by weight and preferably 0.1 to 1% by weight to the (meth)acrylic acid (alkali metal salts). If the additional amount is 0.05% by weight or higher, it is possible to lower the stringiness of the gelating agent in a produced aqueous alkaline solution containing the gelating agent, to improve the stability of the gelating agent in alkaline conditions, and to prevent deterioration of the viscosity with the lapse in time. On the other hand, if the additional amount is 2% by weight or lower, it is possible to prevent the cross-linking density from becoming too high and the absorption amount of the aqueous alkaline solution from lowering, so that the viscosity of the aqueous alkaline solution mixed with the gelating agent is not lowered and the isolation of the alkaline electrolytic solution can be prevented.

In the present invention, as described above, the allyl ether type cross-linking agent (b) with a stable cross-linking structure under a high concentration alkaline condition is preferable as a cross-linking agent and may be used in combination with another cross-linking agent (c) other than allyl ether type ones for the purpose to improve the dispersibility of the gelating agents in an aqueous alkaline solution and improve the absorption speed, although the cross-linking agents commonly used for water-absorptive resin, e.g. ester type cross-linking agents such as trimethylolpropane triacrylate, amide type copolymerizable cross-linking agents such as methylenebisacrylamide, cross-linking agents reactive with carboxylic acids such as ethylene glycol diglycidyl ether, are scarcely effective to lower the stringiness of the polymers under strongly alkaline conditions and to improve the long-term stability of gels since their cross-linking structure is easily decomposed under the strongly alkaline conditions.

As these other cross-linking agents (c), examples are copolymerizable cross-linking agents (c1) having 2 to 10 functional groups in a molecule and represented by N,N'-methylenebisacrylamide, ethylene glycol di(meth)acrylate, trimethylolpropane di(meth)acrylate, trimethylolpropane tri(meth)acrylate, pentaerythritol di(meth)acrylate, pentaerythritol tri(meth)acrylate, pentaerithritol tetra(meth)acrylate and the like and cross-linking agents (c2) reactive with carboxylic acids and represented by polyvalent glycidyl compounds such as ethylene glycol diglycidyl ether, polyvalent isocyanate compounds such as 4,4'-diphenylmethane diisocyanate, polyvalent amine compounds such as ethylene diamine, polyvalent alcohol compounds such as glycerin and the like.

In the case these reactive cross-linking agents (c2) are used, it is common to promote the cross-linking reaction by heating generally at 100 to 230° C. and preferably 120 to 160° C. in any stage after cross-linking agent addition. Further, these reactive cross-linking agents may be used in combination of two or more kinds of them within a prescribed range of the amount and further in combination with the copolymerizable cross-linking agents (c1).

The additional amount of these other cross-linking agents (c) to be added based on the necessity is preferably 0 to 0.5% by weight and more preferably 0 to 0.3% by weight to the weight of (meth)acrylic acid (alkali metal salts).

Production Method of Cross-linked Polymer

An aqueous solution polymerization method for carrying out polymerization of an aqueous monomer solution mainly containing (meth)acrylic acid (alkali metal salts) by adding and dissolving the foregoing allyl ether type cross-linking agent (b) or a polymerization method, so-called a reversed phase suspension polymerization, for carrying out polymerization of a similar aqueous monomer solution by dispersing and suspending the solution in an organic hydrophobic solvent such as hexane, toluene, xylene and the like in the presence of a dispersant makes it possible to produce a gel highly viscose for a long duration under high concentration alkaline conditions and to produce a gel having extremely excellent drain property and a large particle size.

In this invention, common method may be employed for the polymerization method of (meth)acrylic acid (alkali metal salts) by the aqueous solution polymerization or the reversed phase suspension polymerization and examples are a polymerization method using a radical polymerization initiator and methods by radiating radiation, ultraviolet rays, electron beams, and the like.

In the method using a radical polymerization initiator, usable as the initiator are azo compounds [azobisisovaleronitrile, azobisisobutyronitrile, 4,4'-azobis(4-cyanovaleric acid), 2, 2'-azobis[2-methyl-N-(2-hydroxyethyl)propioneamide, 2,2'-azobis(2-amidinopropane) hydrochloride and the like]; inorganic peroxides [hydrogen peroxide, potassium persulfate, ammonium persulfate, sodium persulfate, and the like]; organic peroxides [di-tert-butylperoxide, cumene hydroperoxide, and the like]; redox initiators [combination of reducer such as alkali metal sulfites or bisulfite, ammonium sulfite, ammonium hydrogen sulfite, L-ascorbic acid and the like with peroxide such as alkali metal persulfates, ammonium persulfate, hydrogen peroxide and the like]; and combination of two or more of them.

The method for polymerization using the initiator is no particularly restricted and although it depends on the types of initiators to be used, the polymerization temperature is preferably −10° C. to 100° C. and further preferably −10° C. to 80° C. in order to increase the polymerization degree of (meth)acrylic acid (alkali metal salts).

Also, it is not particularly restricted, the amount of the initiator is preferably 0.000001 to 3.0% by weight and further preferably 0.000001 to 0.5% by weight to the total weight of (meth)acrylic acid and/or their metal salts in order to increase the polymerization degree.

Regarding the polymerization concentration of the aqueous solution polymerization, although it is variously changed depending on other polymerization conditions, the polymerization concentration is preferably 10 to 40% by weight and more preferably 10 to 30% by weight since pseudo-cross-linking (self-cross-linking) of a monomer itself easily takes place in parallel to the polymerization reaction if the polymerization concentration is increased to result in decrease of the absorption amount and the average polymerization degree of straight chain polymers, difficulty in temperature control at the time of polymerization, decrease of the average polymerization degree of polymers and increase of oligomer components. Further, regarding the polymerization temperature, it is preferable to be −10° C. to 100° C. and further preferably −10 to 80° C.

Regarding the dissolved oxygen amount at the time of polymerization, although it depends on the additional amount of the radical initiator, the amount is preferably 0 to 2 ppm and further preferably 0 to 0.5 ppm.

In the present invention, the neutralization degree of (meth)acrylic acid at the time of polymerization is not particularly restricted if a prescribed amount of the allyl ether type cross-linking agent (b) is completely dissolved in an aqueous monomer solution, however the allyl ether type cross-linking agent (b) is generally insufficient in the solubility in water and especially its solubility in an aqueous solution of alkali metal (meth)acrylates is extremely low, so that the cross-linking agent (b) sometimes becomes impossible to carry out prescribed cross-linking attributed to that the agent is sometimes isolated from the aqueous monomer solution to make it impossible to carry out prescribed cross-linking even if the prescribed amount of the allyl ether type cross-linking agent (b) is added and hence the neutralization degree of the (meth)acrylic acid at the time of polymerization is preferably adjusted to be 0 to 30% by mole to carry out polymerization and further neutralization is carried out based on the necessity after the polymerization and it is further preferable to carry out polymerization in un-neutralized state and then to carry out neutralization after polymerization based on the necessity.

Further, if (meth)acrylic acid is polymerized in the same condition, the polymerization degree is increased more in the case of lower neutralization degree, it is therefore preferable to carry out polymerization in the low neutralization state in order to increase the polymerization degree of the polymers.

Regarding the reversed phase suspension polymerization, which is one of polymerization methods to be employed for the present invention, the polymerization method is a method for carrying out polymerization by suspending and dispersing an aqueous solution of (meth)acrylic acid and/or their alkali metal salts in a hydrophobic organic solvent represented by hexane, toluene, xylene and the like in the presence of a dispersant and also in the case of this polymerization method, the monomer concentration in the aqueous monomer solution is preferably 10 to 40% by weight and further preferably 10 to 30% by weight, too.

Incidentally, regarding the reversed phase suspension polymerization, it is essential to use a dispersant at the time of polymerization and examples of the dispersant are surfactants, e.g. sorbitan fatty acid esters, such as sorbitan monostearic acid ester with HLB of 3 to 8, glycerin fatty acid esters such as glycerin monostearic acid ester, sucrose fatty acid esters such as sucrose distearic acid ester; polymer dispersants (hydrophilic group; 0.1 to 20% by weight, the weight average molecular weight; 1,000 to 1,000,000) having hydrophilic groups in a molecule just like ethylene/acrylic acid copolymer, maleic-modified ethylene/vinyl acetate copolymer, styrene sulfonic acid (Na)/styrene copolymer and soluble in a solvent in which the aqueous monomer solution is to be dispersed and since the suspended particle of the aqueous monomer solution can be enlarged more in the solvent and a water-containing gel with a large particle diameter can be produced in the case of using a polymer dispersant as a dispersant, it is preferable to use the polymer dispersant.

The additional amount of a surfactant and/or a polymer dispersant is preferably 0.1 to 20% by weight and further preferably 0.5 to 10% by weight to a hydrophobic organic solvent.

The W/O ratio of an aqueous monomer solution and a hydrophobic organic solvent in the reversed phase suspension polymerization is preferably 0.1 to 2.0 and further preferably 0.3 to 1.0 on the basis of weight.

In the present invention, it is preferable to carry out polymerization in the condition wherein the average weight polymerization degree is preferably 5,000 to 1,000,000 and further preferably 10,000 to 1,000,000 in the case of the foregoing mild polymerization of an aqueous solution of (meth)acrylic acid (alkali metal salts) without using a cross-linking agent. If the polymerization is carried out in the condition that the average polymerization degree becomes 5,000 or higher, using a proper amount of a cross-linking agents makes it possible to lower the viscosity of an aqueous high concentration alkaline solution mixed with a gelating agent and/or to prevent increase of stringiness of the solution. The above polymerization degree is measured by gel permeation chromatography method (GPC method).

Generally, methods applicable for polymerizing (meth) acrylic acid (alkali metal salts) include, other than the aqueous solution polymerization and the reversed phase suspension polymerization, so-called deposition (precipitation) polymerization method for carrying out polymerization an acrylic acid in a polar solvent such as an aromatic hydrocarbon and an alcohol and promoting polymerization based on the difference of the solubility between the monomer and the polymer in the polar solvent, an emulsion polymerization method for carrying out polymerization using an acrylic acid and/or its alkali metal salts using an emulsifying agent, so-called bulk polymerization method for carrying out acrylic acid (alkali metal salts) using no solvent and the like. However, the polymer produced by the precipitation polymerization or the emulsion polymerization generally becomes finely granular and they are impossible to provide an aiming polymer to be a gel with a large particle size necessary to prevent the precipitation of a zinc powder in an aqueous alkaline solution. Even if the particle diameter of a dried polymer produced by the precipitation polymerization method or the emulsion polymerization method followed by granulation is enlarged, the strength in the junction parts becomes weak and thus most of the granulated polymer is broken down to a fine powder state as it is before when it is mechanically stirred in an aqueous alkaline solution, so that these methods are not suitable for the method for producing the gel with a large particle size in an aqueous alkaline solution.

Further, in the precipitation polymerization, polymerization is generally carried out in a polar solvent such as aromatic hydrocarbons, alcohols and the like and these polar solvents have a high chain transfer constant to the growing radicals of the monomer, so that the average polymerization degree of polymers polymerized in the solvents tends to be lowered and oligomers are easy to be produced.

Regarding bulk polymerization, if the polymerization is carried out with approximately 100% of the monomer concentration, an immense quantity of polymerization heat is generated to make polymerization temperature control extremely difficult and consequently it is made difficult to obtain a polymer with a high molecular weight and to produce a large amount of oligomers. Further, also in precipitation polymerization, it is general to carry out polymerization in a polar solvent such as aromatic hydrocarbons and alcohols and these polar solvents have a high chain transfer constant to the growing radicals of the monomer, so that the average polymerization degree of polymers polymerized in the solvents tends to be lowered and oligomers are easy to be produced.

Polymers containing a large amount of polymers with a lowered polymerization degree of acrylic acid monomers and oligomers require addition of a large amount of a cross-linking agent in order to lower the stringiness by cross-linking un-cross-linked polymers, however independently of the molecular weight of polymers, the absorption amount of the cross-linked polymer (A) in an aqueous high concentration alkaline solution tends to be decreased in proportion to the additional amount of the cross-linking agent, the decrease of the stringiness and the increase of the viscosity of the aqueous alkaline solution become unbalance to make it difficult to produce the cross-linked polymer having the above described physical properties in the present invention.

Further, just like a bulk polymerization, if (meth)acrylic acid (alkali metal salts) are polymerized in a high concentration, kind of pseudo-cross-linking reaction, so-called self-cross-linking, is promoted in parallel to the polymerization owing to the characteristics of the monomers to make it extremely difficult to control the cross-linking degree and production of a desired gelating agent of the present invention becomes difficult.

As described above, the cross-linked polymer (A) obtained by polymerization by the aqueous solution polymerization or the reversed phase suspension polymerization has the following properties.

(i) A gel with a large particle size and hardly broken even being stirred in an aqueous alkaline solution can be produced. Consequently, using the polymer (A) as a gelating agent for an alkaline cell, a zinc powder cannot be precipitated through the gel with a large particle size, so that the gelating agent can improve the discharge properties and the life of the cell. Further, since the zinc powder cannot penetrate the gel with a large particle size, the practical zinc powder concentration is increased and the contacting frequency of zinc power particles is increased and thus not only the discharge properties and the life of the cell are improved but also the decrease of voltage and short-circuitting current can be prevented even at the time of impact affecting since the gel with a large particle size is hard to move.

(ii) Since polymerization can be carried out in controlled polymerization temperature and under mild polymerization conditions and water with a low chain transfer constant is used as a solvent, the average polymerization degree of a polymer can be increased and oligomer components can be decreased. Consequently, in the case of using the polymer as a gelating agent for a cell, the polymer can be satisfactory simultaneously in both of the viscosity increase and the stringiness decrease of an aqueous high concentration alkali solution, so that the polymer can be satisfactory simultaneously in both workability improvement at the time of high speed loading of a cell with an alkaline electrolytic solution owing to the low stringiness and cell property improvement owing to the stabilization of a zinc powder attributed to increase of the viscosity of the alkaline electrolytic solution.

In the present invention, the cross-linked polymer (A) is preferably a cross-linked polymer produced by cross-linking a polymer, which has the average polymerization degree of 5,000 to 1,000,000, comprises (meth)acrylic acid and/or their alkali metal salts as main constituent monomers, is produced by an aqueous solution polymerization method or a reversed phase suspension polymerization method, with an allyl ether type cross-linking agent (b) having 2 to 10 allyl groups in a molecule and the additional amount of the agent (b) is preferably 0.05 to 1.0% by weight [the cross-linked polymer (A')] to the total weight of the (meth)acrylic acid and/or their alkaline metal salts.

In the present invention, a water-containing gel of the polymer of obtained by the aqueous solution polymerization or the reversed phase suspension polymerization is generally used being dried.

Regarding the drying method of the water-containing gel, in the case of the aqueous solution polymerization, the examples of the method can be carried out as follows: a water-containing polymer gel is segmented to a certain extent (the level of the segmentation is about 0.5 to 20 mm square) by a meat chopper type or cutter type coarse pulverizer or made to be like a noodle and mixed with an alkali metal hydroxide based on necessity to neutralize the water-containing gel, and then, the resulting water-containing gel is subjected to permeation drying (by layering the water-containing gel on a punched metal or a screen and forcibly ventilating a hot wind at 50 to 150° C.) or to ventilation drying (by putting a water-containing gel, drying the gel by ventilating and circulating a hot wind, and further drying while segmenting the gel by a machine such as a rotary kiln. Between the methods, the permeation drying is preferable to carry out efficient drying within a short time.

On the other hand, the drying method of a water-containing gel in the case of the reversed phase suspension polymerization is generally carried out by vacuum drying (the pressure decrease degree; approximately 100 to 50,000 Pa) or the foregoing ventilation drying after solid-liquid separation of the polymerized water-containing gel and the organic solvent by decantation or the like.

As another drying method for a water-containing gel in the aqueous solution polymerization, there disclosed in Japanese Patent No. 8-28216 is a contact-drying method comprising steps of contracting and extending the water-containing gel on a drum drier and drying the gel, however since the water-containing gel is inferior in the thermal conductivity, a thin film of the water-containing gel has to be formed on the drum for the drying. However, the material of a widely sold drum dry is generally iron or a metal such as iron, chromium, nickel and the like with a lower ionization tendency than zinc and therefore the contacting frequency between the drum metal face and the water-containing gel is extremely heightened and further the water-containing gel is a water-containing gel of poly(meth)acrylic acid and/or their alkali metal salts and therefore the content of the metal ions dissolved in the gel is increased. Further, since the contacting frequency between the foregoing water-containing gel and the drum is extremely high and the foregoing water-containing gel has high viscosity, it is required for the dried product to be peeled from the drum drier by bringing a knife-like tool into contact with the drum drier and owing to the mechanical abrasion of the drum and the knife-like tool, the metal faces of the drum and the knife-like tool are worn out and the dried product is contaminated with the metals. As described above, in the case the contact drying method is employed using the drum drier, the gelating agent is easily be contaminated with metal ions and metal powders and if a gelating agent containing a rather large amount of ions and powders of these metals with a lower ionization tendency than zinc (metals with a lower normal electrode potential than zinc and including metals having atomic symbols of Cr, Fe, Ni, Sn, Pb, Cu, Hg, Ag and the like) is used as the gelating agent for an alkaline cell, cells are formed between the zinc powder and the contaminating metal ions in the cell and hydrogen gas is evolved by the electrolysis to increase the internal pressure of the cell and cause leakage of the alkaline solution and in some extreme cases, the cell is broken and therefore the drying method is not preferable.

Further, the thin film-like dried product obtained by contracting and extending the water-containing gel on the drum drier and drying the gel is made to be a flaky particle even if the dried product is pulverized thereafter and adjusted as to have a desired particle size, so that the strength of the dried product is considerably inferior in the strength as compared with that of a pulverized product of a block-like product dried by the permeation drying method or the ventilation drying method and in the case the obtained powder is swollen in an aqueous alkaline solution with a high concentration and then mechanically stirred and mixed with a zinc powder, the swollen gel is broken to be small and thus the drying method is not preferable.

In the present invention, although it depends on the drier to be employed and the drying duration, the drying temperature at the time of drying the water-containing gel is preferably 50 to 150° C. and further preferably 80 to 130° C. If the drying temperature is 150° C. or higher, the polymer is sometimes cross-linked by the heat at the time of drying to lower the absorption amount and the viscosity and on the other hand, if drying at 50° C. or lower, the drying takes a long time and is not efficient. Also, although it depends on the drier to be employed and the drying temperature, the drying duration is preferably 5 to 300 minutes and further preferably 5 to 120 minutes.

The dried product of a cross-linked polymer obtained in such a manner is pulverized and powdered based on the necessity. A well-known method can be employed for the pulverization method and pulverization can be carried out, for example, by an impact pulverizer (a pin mill, a cutter mill, a squirrel mill, an ACM pulverizer, and the like) and an air pulverizer (a jet pulverizer and the like).

Incidentally, in the case of pulverizing a dried product, it is not preferable to use a pulverizer comprising rotation parts in which metals are brought into direction contact with one another since the metal powders generated by mechanical abrasion are possible to contaminate the gelating agent.

The dried powder based on the necessity may be subjected to a sieving apparatus (a vibration sieving apparatus, a centrifugal sieving apparatus and the like) equipped with a desired screen based on the necessity to obtain a dried powder with a desired particle diameter.

Incidentally, in the present invention, in any stage after the drying, contaminating metal powders of such as iron may be removed using an iron removing apparatus. However, even if iron removal is rather finely carried out using the iron removing apparatus, it is difficult to remove non-magnetic metals by the iron removing apparatus and further even magnetic metals, those contained in the dried polymer particle and adhering to the dried particle cannot be removed and therefore it is desirable to pay careful consideration to the production facilities so as to avoid contamination of these metals from the beginning.

Gelating Agent

In the present invention, although the particle size [the condition (1)] of the gelating agent to be used differs depending on the size of a cell for which the gelating agent is used and the size of a zinc powder, the particle size of the dried powder is generally so adjusted as to contain 50% by weight or more of the gelating agent with the particle size of preferably 300 to 4000 $\mu$m and more preferably 500 to 2000 $\mu$m after the gelating agent is swollen and stirred in an aqueous solution of 40% by weight of potassium hydroxide. If the powder contains 50% by weight or more of the swollen gelating agent with the average particle size of 300 to 4000 $\mu$m, the precipitation of the zinc powder in the cell can be prevented and there takes place no problem at the time of injecting the gelating agent in the cell.

Regarding the particle size at the time of drying, although it depends on the magnification of the swelling of the gelating agent in an aqueous alkaline solution and the distraction degree of the gel in the case of stirring the gel in the aqueous alkaline solution, the particle size is preferably 100 to 1,000 $\mu$m and further preferably 200 to 900 $\mu$m since one side of each gelating agent particle is generally expanded about 3 to 4 times by swelling when the gelating agent is stirred in the aqueous alkaline solution.

The stringiness [the condition (2)] of a gelating agent of the present invention is generally 0 to 20 mm and preferably 0 to 15 mm in the case of an aqueous solution of 40% by weight of potassium hydroxide concentration and containing 3% by weight of the gelating agent.

If the stringiness is 20 mm or lower, the drain property is excellent at the time of high speed injection of the gelating agent-containing alkaline electrolytic solution to a cell and the electrolytic solution does not adhere to the outside of the cell to prevent deterioration of the workability and unevenness of the injection amount of the electrolytic solution per one cell is also narrowed and therefore it is preferable for the stringiness to be within the range.

In the present invention, the method for producing a gelating agent satisfying that the particle size [the condition (1)] and the stringiness [the condition (2)] of the swollen gel are both within the respective ranges is as described above and points of the method can be summarized as follows.

(i) An allyl ether type cross-linking agent (b) in a prescribed amount (within a range of 0.05 to 1.0% by weight, nevertheless, since the optimum point of the cross-linking agent amount differs depending on the average polymerization degree of a polymer and adjustment within the defined range is required.) is added to an aqueous monomer solution containing mainly (meth)acrylic acid and/or their alkali metal salts and the cross-linking agent is completely and evenly dissolved in the aqueous monomer solution.

(ii) A water-containing gel of the cross-linked polymer (A) is produced by carrying out polymerization by an aqueous solution polymerization and/or a reversed phase suspension polymerization in mild polymerization conditions wherein the average polymerization degree of a polymer becomes 5,000 to 1,000,000 in the case of adding no cross-linking agent (b) and excess self-cross-linking (the polymerization concentration is preferably 40% by weight or lower) hardly takes place.

(iii) In the case of the aqueous solution polymerization, after the obtained water-containing gel is segmented to a certain extent based on the necessity, a hydroxide of alkali metals is added based on the necessity to adjust the neutralization degree and drying is carried out by a permeation drying method or a ventilation drying method. In the case of the reversed phase suspension polymerization, after the water-containing gel is subjected to solid-liquid separation, drying is carried out by a vacuum drying method or a ventilation drying method. Incidentally, in order to suppressing the thermal cross-linking of the polymer by heating even at the time of drying, the drying is carried out within a time as short as possible while the drying temperature (the product temperature) being controlled to be 150° C. or lower (preferably 130° C. or lower).

(iv) The dried and pulverized product is pulverized based on the necessity and sieved using a sieving apparatus based on the necessity to produce a gelating agent mainly containing particles of its dried product with the particle size of 100 to 1,000 μm. Since one side of each gelating agent particle of the present invention is generally expanded about 3 to 4 times by swelling when the gelating agent is stirred in the aqueous alkaline solution, the main gelating agent particle obtained has the particle size of 300 to 4000 μm in an aqueous alkaline solution.

(v) The neutralization is carried out within a defined extent of the neutralization degree.

Further, regarding the viscosity [the condition (3)] of a gelating agent of the present invention, the aqueous potassium hydroxide solution of 40% by weight concentration containing 3% by weight of the gelating agent has viscosity of 50 to 1,000 Pa.s, preferably 100 to 200 Pa.s at 40° C. at the beginning and after sixty days. If the viscosity is 50 Pa.s or higher, the precipitation of a zinc powder in a cell can almost completely be prevented and if it is 1,000 Pa.s or lower, the handling property of the aqueous potassium hydroxide solution becomes relatively easy.

The methods described in the foregoing description (i) to (v) may be applied for the method of producing the gelating agent in a manner that the viscosity [the condition (3)] of the aqueous potassium hydroxide solution containing the gelating agent is within a prescribed range.

Further, regarding the content [the condition (4)] of a metal with a lower ionization tendency than zinc in the gelating agent of the present invention, the content of the metal with a lower ionization tendency than zinc in the gelating agent can be controlled to be within 0 to 15 ppm and preferably 0 to 10 ppm by sufficiently paying consideration on the raw materials to be used and the foregoing production facilities.

If the content of the metal with a lower ionization tendency than zinc in the gelating agent is more than 15 ppm, although depending on the. structure and the capacity of a cell to be used and the additional amount of a gelating agent to the cell, cells are formed between the zinc powder and the contaminating metal ions in the cell and hydrogen gas is evolved by the electrolysis to increase the internal pressure of the cell and cause leakage of the alkaline solution and in some extreme cases, the cell is broken and therefore it is not preferable.

A gelating agent of the present invention is preferable to contain 0 to 30% by weight, preferably 0 to 20% by weight, of soluble components in the aqueous solution when the gelating agent is dissolved in an aqueous potassium hydroxide solution of 10% by weight concentration.

If the soluble components of the gelating agent is 30% by weight or lower, the stringiness of the aqueous alkaline solution can be improved and the viscosity decrease can be prevented for a long duration.

In order to lower the content of the soluble components, the average polymerization degree of the polymer is increased or the amount of the cross-linking agent is increased, however if the cross-linking agent is increased, it sometimes occurs that the absorption amount of the gelating agent is lowered and that the viscosity of the aqueous alkaline solution mixed with the gelating agent is decreased and therefore, it is better to increase the average polymerization degree of the polymer.

The methods applicable for packing a gelating agent of the present invention in an alkaline cell are (I) a method carried out by previously mixing the gelating agent of the present invention, an alkaline electrolytic solution (for example, an aqueous potassium hydroxide solution with a high concentration and containing zinc oxide based on the necessity), and a zinc powder (and/or a zinc alloy powder) to produce a mixture of an anode substance and filling an anode container of the cell with the obtained mixture to form a gel-type anode and (II) a method carried out by filling a anode container of a cell with the gelating agent of the present invention and a zinc powder (and/or a zinc alloy powder) and then filling the container further with an alkaline electrolytic solution to produce a gel-type anode and the method (I) is preferable since it is capable of evenly dispersing the zinc powder in the anode container of the cell.

The additional amount of the gelating agent is preferably 0.5 to 10% by weight and further preferably 1.0 to 5.0% by weight to the alkaline electrolytic solution although it variously differs depending on the structure of the anode container, the particle diameter of the foregoing zinc powder, and the additional amount to the alkaline electrolytic solution. If the additional amount is from 0.5 to 10% by weight, the viscosity of the alkaline electrolytic solution becomes proper and the zinc powder can be prevented from precipitation and the handling property also becomes easy.

In the present invention, the method (I) may further comprises a step of adding another gelating agent in combination based on the necessity within an extent in which no problem is caused on the workability and the cell properties for the purpose to improve the fluidity of the mixture of the anode substance at the time of filling.

As another gelating agent, examples are CMC, natural gum, poly(meth)acrylic acid and/or their alkali metal salts, finely cross-linked type poly(meth)acrylic acid and/or their salts, a fine powder of a gelating agent of the present invention, poly(vinyl alcohol) and the like. Among them, finely powder-state finely cross-linked type poly(meth) acrylic acid and/or their salts and a fine powder of a gelating agent of the present invention are preferable since the resin itself has relatively low stringiness and can provide the fluidity at the time of filling with the anode substance mixture.

If the particle size of a thickener to be added based on the necessity has the average particle diameter of 0.1 to 100 $\mu$m and further preferably 0.1 to 50 $\mu$m as a dried product, the particle swollen in an alkaline state is kept small even in the case stringiness of the anode substance mixture is slightly increased owing to the addition of another gelating agent and the amount of the anode substance mixture used for filling the cell is not so much affected and therefore it is preferable.

The additional amount of gelating agents to be added based on the necessity is preferably 0 to 5.0% by weight and further preferably 0 to 3.0% by weight to the alkaline electrolytic solution.

The addition method of another gelating agent may be any one of the following methods: a method by previously dry blending a gelating agent of the present invention and another gelating agent and then blending a zinc powder and other anode substances such as an alkaline electrolytic solution with the obtained mixture; a method adding and mixing another gelating agent at the time of producing the mixture of anode substances differently from the gelating agent of the present invention, a method by mixing the alkaline electrolytic solution with another gelating agent and then mixing the gelating agent of the present invention and a zinc powder and the like and any method as long as it can add a prescribed amount of another gelating agent based on the necessity can be employed. (Examples)

Hereinafter, the present invention will more particularly be described according to examples and comparative examples, however the present invention is not at all restricted to these examples.

The measuring tests were carried out to measure the following (i) to (vi) by the following methods: (i) the absorption amount of the gelating agent in an aqueous potassium hydroxide solution with 40% by weight concentration; (ii) the particle size of the gel (the content of 300 to 4000 $\mu$m, the content of 500 to 2000 $\mu$m); (iii) the stringiness; (iv) the viscosity of the aqueous potassium hydroxide solution with 40% by weight concentration after 1 day and 60 days; (v) the content of the metal with the lower ionization tendency than zinc in the gelating agent; and (vi) the soluble component amount in an aqueous potassium hydroxide solution with 10% concentration. Hereinafter, % shows % by weight unless a specific definition is given.

(i) the absorption amount of the gelating agent in an aqueous potassium hydroxide solution with 40% concentration:

A gelating agent in 2.0 g was put in a bag made of a nylon screen with 250 meshes and having an opening in one side and immersed in an aqueous potassium hydroxide solution with 40% concentration (super grade reagent) for 3 hours and then the nylon screen was pulled up to carry out draining for 30 minutes and the same operation was carried out using an empty nylon screen bag. The absorption amount was measured based on the following equation:

absorption amount (g/g)=(the weight of the nylon screen after immersion–the weight of the nylon screen of the blank test)/2

(ii) the particle size of a gel after the gel was stirred in an aqueous potassium hydroxide solution with 40% concentration:

Together with a rotator (with 4 cm length), 2.0 g of a gelating agent and 300 g of an aqueous potassium hydroxide solution with 40% concentration were put in a 500 ml poly beaker and stirred at 600 rpm speed at a room temperature by a magnetic stirrer. The alkaline solution after the stirring was poured on a sieve with 20 cm diameter equipped with JIS 50 meshes (screen mesh opening: 300 $\mu$m) in the lower stage and JIS 4.7 meshes (screen mesh opening: 4,000 $\mu$m) and washed with an aqueous potassium hydroxide solution with 40% concentration several times. After 30 minute-draining was carried out, the excess aqueous potassium hydroxide solution adhering to the screen was wiped by a Kim wipe and the weight of the gel remaining on the upper part of the sieve with 50 meshes was measured and based on the following equation, the content (%) of the gel with 300 to 4,000 $\mu$m size in the potassium hydroxide was measured:

the content (%) of the gel with 300 to 4,000 $\mu$m size=100×[the weight (g) of the gel on 50 meshes]/[2×absorption amount (g) of the gelating agent].

The same operation was carried out using JIS 30 meshes (screen mesh opening: 500 $\mu$m) in the lower stage and JIS 8.6 meshes (screen mesh opening: 2,000 $\mu$m) to measure the content (%) of the gel in the aqueous potassium hydroxide solution.

the content (%) of the gel with 500 to 2,000 $\mu$m size=100×[the weight (g) of the gel on 30 meshes]/[2×absorption amount (g) of the gelating agent].

(iii) the stringiness of an aqueous potassium hydroxide solution with 40% concentration containing 3% of a gelating agent:

A rotatable elliptical glass ball with 11 mm length and 8 mm width and equipped with a cylindrical joining part with 2.5 mm diameter and 10 mm length attached to one side of a stringiness tester (Kyowa Chemical Industry Co., Ltd.) was immersed in a gel sample of a gelating agent whose viscosity after 1 day was measured to the root part of the cylindrical joining part and the glass ball was elevated at 16 mm/second to be pulled out the gel.

At the time when the glass ball was completely separated from the gel sample, the elevation of the glass ball was stopped and using a measuring apparatus attached to the stringiness tester, the distance (mm) of the point where the glass ball was parted from the gel from the upper face of the gel was measured. The similar operation was repeated in total 10 times and the average value was defined as the stringiness (mm).

(iv) the viscosity of the aqueous potassium hydroxide solution with 40% concentration containing 3% of a gelating agent:

An aqueous potassium hydroxide solution with 40% concentration in 200 g was put in a 250 ml transparent polymer container equipped with a cover and while the content being stirred as to prevent undissolved lump formation, 6.0 g of a gelating agent was added little by little. After the even gelling took place entirely (or the viscosity was increased), the container was put in a thermostat at 40° C. and left for 1 day while being kept closed and then the viscosity of the content was measured by a digital B type viscometer (manufactured by TOKIMEC Co. Ltd.) and the measured viscosity was defined as the viscosity after 1 day (measurement temperature: 40° C., rotor No.4 rotation speed: 3 rpm).

Some of the sample whose viscosity measurement was finished was closed and again put in the thermostat at 40° C. and left for 60 days while being closed and then the viscosity of the content was measured in the similar conditions using the digital B-type viscometer and defined as the viscosity after 60 days.

(v) the content of the metal with the lower ionization tendency than zinc: To an evaporating dish of platinum, 3 g of a gelating agent and 4 ml ion-exchanged water were put and gelling was carried out. The gel sample was mixed with 6 ml of concentrated sulfuric acid and incinerated by heating under the platinum dish by a burner and further heated for 5 hours in an electric furnace (at 800° C.) to be completely incinerated.

A small amount of pure water was poured several times to the platinum dish to wash out the content and transfer the content to a 20 ml mess flask and the volume was adjusted to be 20 ml in total and the contents of metals of Fe, Ni, Cr, Sn, Pb, Cu, and Ag were measured by an ICP (inductively coupling plasma) method. Separately, calibration curves of the foregoing metals were produced using standardized solutions and the contents of the respective metals were measured using the calibration curves:

the metal ion content (ppm)=total amount (g) of Fe, Ni, Cr, Sn, Pb, Cu, and Ag in the gelating agent/the gelating agent sample amount (g).

(vi) the soluble component amount in an aqueous potassium hydroxide solution with 10% concentration:

To a 500 ml beaker, 1 g of a gelating agent and 200 g of an aqueous potassium hydroxide solution with 10% concentration were poured and stirred at 300 rpm for 3 hours using a magnetic stirrer. The stirred solution was filtered with a filtration paper (No. 2 type produced by Toyo Filter Paper Co., Ltd.) to recover the filtrate. The resulting filtrate in 20 g was mixed with 30 g of ion-exchanged water and further with an aqueous 10% sulfuric acid solution to adjust the pH at 7.0 and obtain a sample solution. As a blank, 30 g of ion-exchanged water was added to 20 g of the used aqueous potassium hydroxide solution with 10% concentration and the aqueous 10% sulfuric acid solution was added to adjust the pH at 7.0 and obtain a blank solution.

Using an automatic titration apparatus (GT-05 type manufactured by Mitsubishi Chemical Co. Ltd.), a 0.01 N aqueous potassium hydroxide solutions added to the sample solution until the pH of the sample solution was adjusted to be 10.0 once and further the 0.01 N aqueous hydrochloric acid solution was added until the pH of the sample solution was adjusted to be 2.7 and the amount ml (Va) of the 0.01 N aqueous hydrochloric solution required to adjust the pH at the value was measured. The similar operation was carried out for the blank solution and the additional amount ml (Vb) of the aqueous hydrochloric acid solution was measured.

Based on the following equations 1, 2, 3, the soluble component amount (%) of a gelating agent in an aqueous potassium hydroxide solution was calculated.

$$M=(Va-Vb) \times N \qquad \text{Equation-1}$$

M: the potassium acrylate amount (mmol) in the sample solution, N: the normality of the aqueous hydrochloric acid solution $$W=M \times E \times D \qquad \text{Equation-2}$$

W: the potassium acrylate weight in the sample solution, E: molecular weight of potassium acrylate, D: dilution ratio (200/20)

$$\text{the soluble component amount } (\%)=W\ (g) \times 100 / \text{sample weight (g)} \qquad \text{Equation-3}$$

Incidentally, in the case the gelating agent composition contains methacrylic acid, the foregoing E value was adjusted to be the molecular weight of potassium methacrylate. Regarding the polymers obtained by copolymerization of monomers other than (meth)acrylic acid, the carboxylic acid amounts per unit molecular weight were measured and correction was performed.

EXAMPLE 1

To a 2 liter beaker, 200 g of acrylic acid, 0.6 g of pentaerythritol triallyl ether (0.3%/acrylic acid) (produced by Daiso Co., Ltd.), and 800 g of ion-exchanged water were added and cooled to 8° C.

The resulting aqueous acrylic acid solution was put in a 1.5 liter heat insulating polymerization tank and while nitrogen gas being introduced into the aqueous solution to lower the dissolved oxygen amount of the aqueous solution to 0.1 ppm or lower and 4.0 g of an aqueous 0.1% hydrogen peroxide and 4.0 g of an aqueous 0.1% L-ascorbic acid solution and 1.0 g of a 10% aqueous solution of 2,2'-azobis (2-amidinopropane) hydrochloride (trade name: V-50 produced by Wako Pure Chemical Industries, Ltd.) were added to the aqueous solution and the nitrogen purge for the aqueous solution was continued until the polymerization was started. Since the polymerization was started and the viscosity of the aqueous acrylic acid solution was started increasing, the purge with nitrogen was stopped and polymerization was carried out for 6 hours. The temperature of the aqueous acrylic acid solution was measured by a multi-point thermometer and found that the highest temperature was 63° C.

Incidentally, in said polymerization, the average polymerization degree of the polymer obtained by polymerization without using the pentaerythritol triallyl ether as a cross-linking agent was measured using GPC and found to be about 28,000.

The resulting block-type cross-linked water-containing gel was taken out from the heat insulating polymerization tank and the gel was segmented to be 3 to 10 mm using a small type meat chopper (manufactured by Loyal Co. Ltd.) and then mixed with 222 g of an aqueous solution of 40% of sodium hydroxide (super grade reagent) (neutralization degree 80% by mole) to be neutralized.

The neutralized water-containing gel was layered in 5 cm thickness on a screen made of SUS with 850 $\mu$m opening and hot wind air at 120° C. was transmitted through the water-containing gel for 1 hour using a small type permeation drier (manufactured by Inoue Metal Co., Ltd.) to dry the water-containing gel.

The dried product was pulverized using a cooking mixer and particles with particle diameter of 210 to 850 μm (JIS: 70 meshes to JIS:

18 meshes) were taken using sieves and thus obtain a gelating agent (1) of the present invention.

Regarding the gelating agent (1) of the present invention, the following were measured: the content of the metals in the gelating agent; the absorption amount of the gelating agent in an aqueous potassium hydroxide solution with 40% by weight concentration; the viscosity, the stringiness, and the particle size of the gel (the content of 300 to 4000 μm, the content of 500 to 2000 μm) of the aqueous potassium hydroxide solution with 40% by weight concentration and mixed with the gelating agent after 1 day and 60 days; and the soluble component amount in an aqueous potassium hydroxide solution with 10% concentration.

Further, the similar measurement was carried out for the examples 2 to 5 and the comparative examples 1 to 10 and the results were shown in Table 1.

EXAMPLE 2

A gelating agent (2) of the present invention was obtained by carrying out the similar operation as that of the example 1, except that the additional amount of pentaerythritol triallyl ether was changed to be 0.2 g (0.1%/acrylic acid) in the example 1.

EXAMPLE 3

A solution was obtained by mixing 0.1 g of ethylene glycol diglycidyl ether (Denalcol 810 produced by Nagase Chemicals Ltd.), 7.9 g of methanol, 2.0 g of ion-exchanged water and sufficiently mixed with 100 g of the gelating agent (2) obtained in the example 2 in the present invention. The mixed powder was put in an air circulation type drier at 130° C. and heated for 30 minute to carry out surface cross-linking of the gelating agent and to obtain a gelating agent (3) of the present invention.

EXAMPLE 4

In a 1 liter beaker, 100 g of acrylic acid, 272.2 g of ion exchanged water and 0.2 g of pentaerythritol triallyl ether (0.2%/acrylic acid) were mixed to dissolve the cross-linking agent. While the beaker being cooling in ice bath, 27.8 g of an aqueous sodium hydroxide solution with 40% concentration was added to neutralize some (20% by mole) of the acrylic acid. After the neutralized monomer solution was cooled to 5° C., 0.2 g of potassium persulfate was added as a polymerization initiator.

Using hot bath, 1000 ml of cyclohexane and 10 g of sodium styrenesulfonate/styrene block copolymer as a dispersant were mixed in 2 liter separable flask equipped with a stirring apparatus and a condenser (a cooling apparatus) and the content was heated at 60° C. to dissolve the dispersant in cyclohexane.

Nitrogen gas was introduced into the cyclohexane solution in the separable flask to lower the dissolved oxygen in the cyclohexane and then while the cyclohexane being stirred using the stirring apparatus, 400 g of said aqueous monomer solution was dropwise added using a titration funnel and reversed phase suspension polymerization was carried out at 60° C. polymerization temperature, and further on completion of the titration of the aqueous monomer solution, 2-hour heating was further performed to complete the suspension polymerization and to obtain spherical water-containing gel with a large particle size in cyclohexane.

After the rotation of the stirring apparatus was stopped and the produced water-containing gel was precipitated, cyclohexane was removed by decantation and the remaining water-containing gel was washed with cyclohexane several times to remove the dispersant adhering to the water-containing gel.

The obtained spherical water-containing gel with a large particle size was spread on a peeling paper and dried for 2 hours by a vacuum drier at 80° C. (10,000 to 20,000 Pa). The particle size of the dried product was measured to find that 92% of the product had 210 to 850 μm particle size and therefore the obtained product was used as it is as a gelating agent (4) of the present invention.

EXAMPLE 5

A gelating agent (5) of the present invention was obtained by blending 75g of the gelating agent obtained by the example 1 of the present invention and 25 g of a finely cross-linking type polyacrylic acid fine powder (trade name: CARBOPOL 941 produced by BF Gridrich Company) in powder state.

Regarding the gelating agent (5) of the present invention, the following were measured: the content of the metals in the gelating agent; the absorption amount of the gelating agent in an aqueous potassium hydroxide solution with 40% by weight concentration; the viscosity, the stringiness, and the particle size of the gel (the content of 300 to 4000 μm, the content of 500 to 2000 μm) of the aqueous potassium hydroxide solution with 40% by weight concentration and mixed with the gelating agent after 1 day and 60 days; and the soluble component amount in an aqueous potassium hydroxide solution with 10% concentration. The results were shown in Table 1.

Comparative Example 1

A commercialized carboxymethyl cellulose (CMC 2450 produced by Daicel Chem. Ind., Ltd.) was used as a comparative gelating agent (I).

Comparative Example 2

A commercialized finely cross-linked polyacrylic acid fine powder (CARBOPOL 941 with the average particle size of about 20 μm produced by BF Gridrich Company) was used as a comparative gelating agent (II).

Comparative Example 3

A commercialized finely cross-linked polyacrylic acid fine powder (Junlon PW-150 with the average particle size of about 20 t m produced by Nihon Junyaku Co., Ltd.) in 20 g was mixed with an aqueous methanol solution (a mixture of methanol/water=70/30) and granulated. The granulated product was dried at 100° C. by an air circulation type drier and then lightly pulverized with a cooking mixer and sieved using a sieving apparatus to obtain the particles with 210 to 850 μm and the particles were used as a comparative gelating agent (III).

Comparative Example 4

The gelating agent (1) obtained by the example 1 was pulverized using a jet mill pulverizer (manufactured by Nippon Neumatic Co. Ltd.) to make the average particle size 20 μm.

The finely pulverized fine powder in 20 g was mixed with 10 g of an aqueous methanol solution (a mixture of methanol/water=70/30) and granulated. The granulated product was dried at 100° C. by an air circulation type drier and then lightly pulverized with a cooking mixer and sieved using a sieving apparatus to obtain the particles with 210 to 850 μm and the particles were used as a comparative gelating agent (IV).

Comparative Example 5

To a 1.5 liter polymer beaker, 30 g of acrylic acid, 770 g of a 35% aqueous sodium acrylate solution, 2 g of ion exchanged water, 0.005 g (0.0017%/acrylic acid) of methylenebisacrylamide, 0.01 g (0.0034%/acrylic acid) of trimethylolpropane diallyl ether were added and cooled to 10° C. using an ice bath. After nitrogen gas was introduced into the solution to lower the dissolved oxygen, 5 ml of an aqueous ammonium persulfate solution with 0.2% of ammonium persulfate and 5 ml of an aqueous SORBIT N solution with 0.06% concentration (a polymerization initiator and an ascorbic acid type reducing agent) were added and mixed to start the polymerization. The polymerization was completed in about 2 hours and the highest temperature reached about 85° C.

The water-containing gel after the polymerization was taken out from the polymer container and segmented into 1 cm square using scissors. The segmented gel in about 10 g was put in 100 g of an aqueous methanol solution with 60% concentration (a mixture of methanol/water=60/40) and immersed in the aqueous methanol solution for 24 hours. When the water-containing gel after immersion was observed, the surface of the water-containing gel becomes opaque owing to discharge of water in the water-containing gel, whereas the inside was as the water-containing gel as it was before the immersion and without regard to that, the gel was put in an air circulation type drier at 105° C. and dried for 24 hours.

The dried product was pulverized using a cooking mixer and particles with 210 to 850 μm were collected using a sieving apparatus and employed as a comparative gelating agent (V).

Comparative Example 6

94 g of sodium acrylate, 28 g of acrylic acid, 0.5 g of N,N-methylenebisacrylamide, and 400 g of water were put in an openable tightly closed container and in nitrogen atmosphere, the solution temperature was kept at 20° C. and 1 g of an aqueous ammonium persulfate solution with 0.5% of ammonium persulfate and 1 g of 0.5% sodium hydrogen sulfite were added and mixed to start the polymerization. The highest temperature reached about 75° C.

After 6 hours, the water-containing gel was taken out from the tightly closed container and segmented into 0.5 to 2 mm by passing the gel through a meat chopper several times in order to carry out drying by a drum drier. The segmented water-containing gel was put between the drum drier (produced by Kusunoki Machinery Co. Ltd.) made of an iron-chromium alloy and heated at 160° C. and pressurizing rolls installed in the drum drier and made of Teflon (the clearance of 0.5 mm) and the water-containing gel was rolled in 0.5 mm film thickness on the drum drier and dried for 3 minutes. After drying, a knife (made of a SUS) installed in the drum drier was brought into contact with the drum drier and the dried film was peeled from the drum drier. The thickness of the film was measured by a film thickness meter to find the thickness about 0.2 mm.

The dried film was segmented by a cooking mixer and particles with 210 to 850 μm were collected using a sieving apparatus and employed as a comparative gelating agent (VI).

Comparative Example 7

100 g of acrylic acid, 0.5 g of tetraallyloxyethane, and 400 g of water were put in an openable tightly closed container and in nitrogen atmosphere, the solution temperature was kept at 10° C. and 1 g of an aqueous hydrogen peroxide with 1% and 1 g of a 0.5% aqueous L-ascorbic acid solution were added and mixed to start the polymerization. The highest temperature reached about 65° C.

After 6 hours, the water-containing gel was taken out from the tightly closed container and segmented into 0.5 to 2 mm by passing the gel through a meat chopper several times in order to carry out drying by a drum drier. The segmented water-containing gel was put between the drum drier made of an iron-chromium alloy and heated at 160° C. and pressurizing rolls installed in the drum drier and made of Teflon (the clearance of 0.5 mm) and the water-containing gel was rolled in 0.5 mm film thickness on the drum drier and dried for 3 minutes. After drying, a knife (made of a SUS) installed in the drum drier was brought into contact with the drum drier and the dried film was peeled from the drum drier. The thickness of the film was measured by a film thickness meter to find the thickness about 0.2 mm. The dried film was segmented by a cooking mixer and particles with 210 to 850 μm were collected using a sieving apparatus and employed as a comparative gelating agent (VII).

Comparative Example 8

A comparative gelating agent (VIII) was obtained by carrying out the same operation as that of the example 1, except that the additional amount of the pentaerythritol triallyl ether used in the example 1 was changed to be 0.06 g (0.03%/acrylic acid).

Comparative Example 9

A comparative gelating agent (IX) was obtained by carrying out the similar operation to that of the example 1, except that the additional amount of the polymerization initiators (hydrogen peroxide, ascorbic acid V-50) used in the example 1 was increased as much as 10 times and a 20% aqueous ethanol solution (ethanol/water=20/80) was used in place of ion-exchanged water.

Incidentally, the average polymerization degree of the polymerized polymer without using the pentaerythritol triallyl ether, which was a cross-linking agent, was measured by GPC and found that the average polymerization degree was about 1,700.

Comparative Example 10

A commercialized water-absorptive resin (Junlon QP with the average particle size of about 100 μm produced by Nihon Junyaku Co., Ltd.) was employed as a comparative gelating agent (X).

Using the gelating agents (1) to (5) produced by the examples 1 to 5 and the gelating agents (I) to (X) produced by the comparative examples 1 to 10 and an alkaline electrolytic solution, the following properties were measured by the following methods: the precipitation property of a zinc powder [trade name: 004F (2)/68 produced by UNION MINIERES. A.), the injection time, the unevenness of the injection amount, the hydrogen gas evolution amount, the retention duration and the impact resistance of model cells. The results were shown in Table 2.

Precipitation of a Zinc Powder

To a 1 liter biaxial kneader (trade name: PNV-1 manufactured by Irie Shokai Co., Ltd.), 500 g of an aqueous potassium hydroxide solution with 40% concentration and 15 g of a gelating agent were added and mixed at 50 rpm speed for 60 minutes to produce a gel-state aqueous potassium hydroxide solution.

Then, 50 g of the produced gel-state aqueous potassium hydroxide solution was put in a tightly closable sample vial with 50 ml of capacity (the diameter of 34 mm, the height of 77 mm, and made of a polypropylene) and foams entrained at the time of mixing was defoamed in decreased pressure and after that, 10 g of a zinc powder with the average particle size of 150 μm was added as evenly as possible to the gel-state aqueous potassium hydroxide solution.

The sample vial was tightly closed and kept at 40° C. in a thermostat for 30 days and using an apparatus installed in a powder tester (manufactured by Hosokawa Micron Co., Ltd.), a screw pipe was tapped (30 times/min) from 3 cm 300 times to promote the precipitation of the zinc powder. On completion of the tapping, the remotest distance (mm) of the zinc powder from the initial position of the zinc powder was measured and the value was defined as the precipitation property (mm) of the zinc powder. [the injection duration and unevenness of the injection amount]

To a 1 liter biaxial kneader, 500 g of an aqueous potassium hydroxide solution with 40% concentration and 15 g of a gelating agent were added and mixed at 50 rpm speed for 60 minutes to produce a gel-state aqueous potassium hydroxide solution. The produced gel-state aqueous potassium hydroxide solution was transferred to a beaker and the foams entrained at the time of mixing were defoamed in the decreased pressure.

The defoamed gel-state aqueous potassium hydroxide solution was sucked in the inside of a 20 ml injector having an injection inlet with the inner diameter of 5 mm and gauges of 0.1 ml unit.

The injector was compressed to 2.0 ml through the opening of the 5 ml sample vial (the inner diameter of 18 mm and the height of 40 mm) in the height direction to inject the gel-state aqueous potassium hydroxide solution and the duration (second) from the moment of the completion of the compression of the injector to the moment when the gel-state aqueous potassium hydroxide solution was completely separated from the injection inlet of the injector was measured by a stop watch. The similar operation was repeated 20 times in total and the average value was employed as the injection duration (second).

The weight of the aqueous potassium hydroxide solution injected to the sample vial was measured (20 times) and the standard deviation (σ) of the injection amounts was calculated and employed as the unevenness of the injection amounts.

Hydrogen Gas Evolution Amount

To a 50 ml sample vial (the diameter of 34 mm, the height of 77 mm, and made of a polypropylene), 15 g of a zinc powder (a reagent, the particle size of about 50 μm), 50 g of an aqueous potassium hydroxide solution with 40% concentration saturated with zinc oxide, and 1.5 g of a gelating agent were added and evenly mixed using a rod made of Teflon.

A cover (having a hole with the diameter of about 3 mm to make insertion of a gas detection tube possible to be inserted through and closed with a sealing tape) was put on the sample vial to close the inside and the sample vial was put in a thermostat at 50° C. for 10 days.

The sample vial was taken out after 30 days and a hydrogen gas detection tube (Kitagawa-type gas detection tube, manufactured Komei Rikagaku Industry Co. Ltd., the hydrogen gas measurement range: 500 to 8000 ppm) was inserted into the vapor phase part of the sample vial through the previously opened hole of the cover to measure the hydrogen gas concentration in the vapor phase.

Retention Duration of a Cell

To a 1 liter biaxial kneader, 500 g of an aqueous potassium hydroxide solution with 40% concentration saturated with zinc oxide, 500 g of a zinc powder, and 12.5 g of a gelating agent were added and mixed at 70 rpm speed for 60 minutes to produce a gel-state aqueous zinc electrolytic solution.

Defoaming was performed in the decreased pressure and 15 g of the zinc electrolytic solution was injected in the inside of an anode container of an LR-20 type model cell as shown in FIG. 1 to produce a model cell.

An external resistance of 2Ω at a room temperature (20 to 25° C.) was connected with the produced model cell and continuous discharge was carried out and the duration to the time when the voltage was decreased to 0.9 V was defined as the retention duration (hour). Similar operation was carried out for the model cell kept at 50° C. in a thermostat for 60 days after production of the model cell and the retention duration of the cell was measured.

Impact Resistance of a Cell

A model cell was produced in the same manner as described above and while continuous discharge being carried out by connecting an external resistance of 2Ω at a room temperature (20 to 25° C.), the model cell was dropped from the height of 1 m successively 10 times and the voltage values before the dropping and immediately after dropping were measured and the impact resistance (%) was calculated according to the following equation:

impact resistance (%)=(the voltage (V) immediately after dropping (10th time)/the voltage (V) before dropping)×100.

Similar operation was carried out for the model cell kept at 50° C. in a thermostat for 60 days after production of the model cell and the impact resistance of the cell was measured.

TABLE 1

| | Gelating agent | Absorption amount (g/g) | Water-containing gel particle diameter (%) | | Stringiness (mm) | Viscosity (Pa.s) | | Metal content (ppm) | Soluble component amount (%) |
| | | | 300/4000 (μm) | 500/2000 (μm) | | After 1 day | After 60 days | | |
| --- | --- | --- | --- | --- | --- | --- | --- | --- | --- |
| Example 1 | Gelating agent (1) | 35 | 92 | 90 | 6.0 | 80 | 100 | 1.7 | 8 |
| Example 2 | Gelating agent (2) | 40 | 83 | 81 | 12.0 | 110 | 120 | 1.8 | 16 |
| Example 3 | Gelating agent (3) | 40 | 83 | 80 | 11.8 | 110 | 120 | 1.8 | 16 |
| Example 4 | Gelating agent (4) | 36 | 87 | 85 | 8.0 | 60 | 80 | 0.8 | 12 |

TABLE 1-continued

| | Gelating agent | Absorption amount (g/g) | Water-containing gel particle diameter (%) | | | Viscosity (Pa.s) | | Metal content (ppm) | Soluble component amount (%) |
|---|---|---|---|---|---|---|---|---|---|
| | | | 300/4000 (μm) | 500/2000 (μm) | Stringiness (mm) | After 1 day | After 60 days | | |
| Example 5 | Gelating agent (5) | 27 | 63 | 60 | 18.0 | 110 | 120 | 2.0 | 25 |
| Comparative Example 1 | Gelating agent (I) | 32 | 0 (dissolved) | 0 | 38.2 | 80 | 8 | 7.6 | — |
| Comparative Example 2 | Gelating agent (II) | 35 | 1 (dissolved) | 1 | 54.2 | 130 | 140 | 3.1 | 70 |
| Comparative Example 3 | Gelating agent (III) | 38 | 15 (dissolved) | 8 | 50.2 | 100 | 110 | 4.3 | 72 |
| Comparative Example 4 | Gelating agent (IV) | 36 | 3 | 3 | 10.0 | 65 | 80 | 2.8 | 9 |
| Comparative Example 5 | Gelating agent (V) | 37 | 48 | 42 | 38.6 | 42 | 45 | 1.8 | 40 |
| Comparative Example 6 | Gelating agent (VI) | 35 | 7 (dissolved) | 5 | 67.6 | 40 | 30 | 52.6 | 90 |
| Comparative Example 7 | Gelating agent (VII) | 32 | 43 | 25 | 5.1 | 50 | 65 | 53.3 | 7 |
| Comparative Example 8 | Gelating agent (VIII) | 42 | 60 | 46 | 37.5 | 100 | 120 | 1.7 | 32 |
| Comparative Example 9 | Gelating agent (IX) | 27 | 62 | 46 | 36.2 | 25 | 30 | 1.8 | 41 |
| Comparative Example 10 | Gelating agent (X) | 38 | 35 | 20 | 40.1 | 65 | 35 | 5.3 | 36 |

TABLE 2

| | Gelating agent | Precipitation property of zinc (mm) | Injection duration (SEC.) | Injection amount unevenness (σ) | Hydrogen gas amount (ppm) | Retention duration of a cell (hour) | | Impact resistance of a cell (%) |
|---|---|---|---|---|---|---|---|---|
| | | | | | | Immediately after production | After 60-day-storage | |
| Example 1 | Gelating agent (1) | 1 | 0.1 | 0.02 | 500> | 15.2 | 15.1 | 97 |
| Example 2 | Gelating agent (2) | 1 | 0.2 | 0.03 | 500> | 15.0 | 14.8 | 96 |
| Example 3 | Gelating agent (3) | 1 | 0.2 | 0.03 | 500> | 15.1 | 14.8 | 96 |
| Example 4 | Gelating agent (4) | 2.5 | 0.2 | 0.03 | 500> | 14.8 | 14.7 | 95 |
| Example 5 | Gelating agent (5) | 2.5 | 0.8 | 0.04 | 500> | 14.0 | 13.8 | 90 |
| Comparative Example 1 | Gelating agent (I) | 55 | 3.8 | 0.21 | 500> | 6.5 | 3.0 | 15 |
| Comparative Example 2 | Gelating agent (II) | 48 | 4.0 | 0.15 | 500> | 8.7 | 7.0 | 35 |
| Comparative Example 3 | Gelating agent (III) | 46 | 3.8 | 0.20 | 500> | 9.5 | 8.0 | 38 |
| Comparative Example 4 | Gelating agent (IV) | 30 | 1.2 | 0.04 | 500> | 11.6 | 10.5 | 50 |
| Comparative Example 5 | Gelating agent (V) | 18.8 | 2.8 | 0.32 | 500> | 12.8 | 11.0 | 65 |
| Comparative Example 6 | Gelating agent (VI) | 48 | 4.6 | 0.23 | 2100 | 9.4 | 5.6 | 30 |
| Comparative Example 7 | Gelating agent (VII) | 13 | 0.3 | 0.05 | 2200 | 12.3 | 12.0 | 60 |
| Comparative Example 8 | Gelating agent (VIII) | 9 | 2.8 | 0.31 | 500> | 13.0 | 12.5 | 70 |

TABLE 2-continued

|  | Gelating agent | Precipitation property of zinc (mm) | Injection duration (SEC.) | Injection amount unevenness (σ) | Hydrogen gas amount (ppm) | Retention duration of a cell (hour) | | Impact resistance of a cell (%) |
|---|---|---|---|---|---|---|---|---|
|  |  |  |  |  |  | Immediately after production | After 60-day-storage |  |
| Comparative Example 9 | Gelating agent (IX) | 16 | 2.6 | 0.25 | 500> | 10.2 | 9.0 | 40 |
| Comparative Example 10 | Gelating agent (X) | 13 | 2.4 | 0.30 | 500> | 12.8 | 11.3 | 75 |

A gelating agent of the present invention has the following effects.
(i) In the case of using a gelating agent of the present invention for an alkaline cell, a cell with durable discharge time and remarkably excellent impact resistance for a long duration can be produced.
(ii) Since an alkaline electrolytic solution containing a gelating agent of the present invention has good draining property, the solution can sufficiently satisfy the high speed charging with the alkaline electrolytic solution required attributed to the recent tendency of increasing the speed of the cell production.
(iii) Since the unevenness of the charging amount per one cell with an electrolytic solution is scarce in the case of charging, cells with uniform quality can be produced even by mass production.
(iv) Since hydrogen gas is scarcely evolved even if a zinc powder is brought into contact in an alkaline electrolytic solution, there is no probability of leakage of the electrolytic solution and damage of the cell owing to the increase of the inner pressure of the cell.

Industrial Applicability

Owing to the above described effects, a gelating agent of the present invention is useful as a gelating agent for not only a cylindrical alkaline cell but also a primary and a secondary alkaline cells such as an alkaline button battery, a silver oxide battery, a nickel-cadmium storage battery, a nickel-hydrogen storage battery and the like.

What is claimed is:

1. A swelling-in-water type gelating agent of a cross-linked polymer (A) comprising (meth)acrylic acid and/or its alkali metal salt as a main constituent monomer unit and obtained by an aqueous solution polymerization or a reversed phase suspension polymerization, wherein the gelating agent is for an alkaline cell and satisfies the following required conditions (1) to (4):
   required condition (1); that the gelating agent contains 50% by weight or more of a particle whose swollen particle size becomes 300 to 4,000 μm when the gelating agent is swollen in an aqueous potassium hydroxide solution of 40% by weight concentration;
   required condition (2); that the aqueous potassium hydroxide solution of 40% by weight concentration containing 3% by weight of the gelating agent has 0 to 20 mm stringiness;
   required condition (3); that the aqueous potassium hydroxide solution of 40% by weight concentration containing 3% by weight of the gelating agent has viscosity of 50 to 1,000 Pa.s at 40° C. after one day and sixty days; and
   required condition (4); that the gelating agent contains 0 to 15 ppm of a metal with a lower ionization tendency than zinc.

2. The gelating agent for an alkaline cell according to claim 1, wherein the polymer (A) is a cross-linked polymer with 5,000 to 1,000,000 average polymerization degree and cross-linked by an allyl ether type cross-linking agent (b) having 2 to 10 of allyl groups in a molecule and the cross-linking agent (b) is added in 0.05 to 1.0% by weight to the total weight of the (meth)acrylic acid and/or its alkali metal salt and the gelating agent satisfies the following required conditions (1) to (3):
   required condition (1); that the gelating agent contains 50% by weight or more of a particle whose swollen particle size becomes 300 to 4,000 μm when the gelating agent is swollen in an aqueous potassium hydroxide solution of 40% by weight concentration;
   required condition (2); that the aqueous potassium hydroxide solution of 40% by weight concentration containing 3% by weight of the gelating agent has 0 to 20 mm stringiness; and
   required condition (3); that the aqueous potassium hydroxide solution of 40% by weight concentration containing 3% by weight of the gelating agent has viscosity of 50 to 1,000 Pa.s at 40° C. after one day and sixty days.

3. The gelating agent for an alkaline cell according to claim 2, wherein the gelating agent satisfies the following required condition (4):
   required condition (4); that the gelating agent contains 0 to 15 ppm of a metal with a lower ionization tendency than zinc.

4. The gelating agent for an alkaline cell according to claim 2, wherein the agent (b) has 3 to 10 of allyl groups in a molecule and 1 to 5 of hydroxyl groups in a molecule.

5. The gelating agent for an alkaline cell according to claim 2, wherein the swollen particle satisfying the required condition (1) has particle size of 500 to 2,000 μm.

6. The gelating agent for an alkaline cell according to claim 2, wherein the soluble component amount of the gelating agent in ithe aqueous solution is 0 to 30% by weight when the gelating agent is swollen in an aqueous potassium hydroxide solution of 10% by weight concentration.

7. The gelating agent for an alkaline cell according to claim 2, wherein the polymer (A) is obtained by polymerizing a monomer mainly (meth)acrylic acid and/or its alkali metal salt with neutralization degree of 0 to 30% by mole and further neutralizing the polymer based on the necessity after polymerization.

8. The gelating agent for an alkaline cell according to claim 1, wherein the swollen particle satisfying the required condition (1) has particle size of 500 to 2,000 μm.

9. The gelating agent for an alkaline cell according to claim 1, wherein the soluble component amount of the gelating agent in the aqueous solution is 0 to 30% by weight when the gelating agent is swollen in an aqueous potassium hydroxide solution of 10% by weight concentration.

10. The gelating agent for an alkaline cell according to claim 1, wherein the polymer (A) is obtained by polymerizing a monomer mainly (meth)acrylic acid and/or its alkali metal salt with neutralization degree of 0 to 30% by mole and further neutralizing the polymer based on the necessity after polymerization.

11. The gelating agent for an alkaline cell according to claim 1 obtained by carrying out permeation drying and/or ventilation drying after segmentation of water-containing gel based on the necessity in the process of drying the water-containing gel of the polymer (A) or by carrying out vacuum drying and/or ventilation drying after solid-liquid separation of the water-containing gel.

12. An alkaline cell comprising an alkaline electrolytic solution containing a zinc powder as an anode, wherein the gelating agent for an alkaline cell as claimed in claim 1 is added in 0.5 to 10% by weight to the weight of the alkaline electrolytic solution.

13. An alkaline cell comprising an alkaline electrolytic solution containing a zinc powder as an anode, wherein the cell contains a gelating agent, as claimed in either claim 1 or claim 2, which is of a cross-linked polymer (A) comprising (meth)acrylic acid and/or its alkali metal salt as a main constituent monomer unit, obtained by an aqueous solution polymerization or a reversed phase suspension polymerization, useful for an alkaline cell and satisfies the following required conditions (1) to (4):

required condition (1); that the gelating agent contains 50% by weight or more of a particle whose swollen particle size becomes 300 to 4,000 μm when the gelating agent is swollen in an aqueous potassium hydroxide solution of 40% by weight concentration;

required condition (2); that the aqueous potassium hydroxide solution of 40% by weight concentration containing 3% by weight of the gelating agent has 0 to 20 mm stringiness;

required condition (3); that the aqueous potassium hydroxide solution of 40% by weight concentration containing 3% by weight of the gelating agent has viscosity of 50 to 2,000 Pa.s at 40° C. after one day and sixty days; and required condition (4); that the gelating agent contains 0 to 15 ppm of a metal with a lower ionization tendency than zinc.

14. The alkaline cell according to claim 13, wherein the polymer (A) is a cross-linked polymer with 5,000 to 1,000,000 average polymerization degree and cross-linked by an allyl ether type cross-linking agent (b) having 2 to 10 of allyl groups in a molecule and the cross-linking agent (b) is added in 0.05 to 1.0% by weight to the total weight of the (meth)acrylic acid and/or its alkali metal salt.

15. A swelling-in-water type gelating agent of a cross-linked polymer (A') obtained by cross-linking a polymer which comprises (meth)acrylic acid and/or its alkali metal salt as a main constituent monomer unit, has 5,000 to 1,000,000 average polymerization degree and is produced by an aqueous solution polymerization or a reversed phase suspension polymerization, with an allyl ether type cross-linking agent (b) having 2 to 10 of allyl groups in a molecule and added in 0.05 to 1.0% by weight to the total weight of the (meth)acrylic acid and/or its alkali metal salt, wherein the gelating agent is for an alkaline cell and satisfies the following required conditions (1) to (4):

required condition (1); that the gelating agent contains 50% by weight or more of a particle whose swollen particle size becomes 300 to 4,000 μm when the gelating agent is swollen in an aqueous potassium hydroxide solution of 40% by weight concentration;

required condition (2); that the aqueous potassium hydroxide solution of 40% by weight concentration containing 3% by weight of the gelating agent has 0 to 20 mm stringiness;

required condition (3); that the aqueous potassium hydroxide solution of 40% by weight concentration containing 3% by weight of the gelating agent has viscosity of 50 to 1,000 Pa.s at 40° C. after one day and sixty days; and required condition (4); that the gelating agent contains 0 to 15 ppm of a metal with a lower ionization tendency than zinc.

16. The gelating agent for an alkaline cell according to claim 15, wherein the swollen particle satisfying the required condition (1) has particle size of 500 to 2,000 μm.

17. The gelating agent for an alkaline cell according to claim 15 containing 0 to 30% by weight of soluble components in an aqueous potassium hydroxide solution of 10% by weight concentration when the gelating agent is swollen in the said aqueous solution.

18. The gelating agent for an alkaline cell according to claim 15, wherein the polymer (A') is obtained by polymerizing a monomer mainly (meth)acrylic acid and/or its alkali metal salt with neutralization degree of 0 to 30% by mole and neutralizing the polymer based on the necessity after polymerization.

19. The gelating agent for an alkaline cell according to claim 15 obtained by carrying out permeation drying and/or ventilation drying after segmentation of water-containing gel based on the necessity in the process of drying the water-containing gel of the polymer (A') or carrying out vacuum drying and/or ventilation drying after solid-liquid separation of the water-containing gel.

* * * * *

UNITED STATES PATENT AND TRADEMARK OFFICE
CERTIFICATE OF CORRECTION

PATENT NO. : 6,667,133 B1
DATED : December 23, 2003
INVENTOR(S) : Sumiya et al.

It is certified that error appears in the above-identified patent and that said Letters Patent is hereby corrected as shown below:

<u>Column 28,</u>
Line 51, delete "ithe" and substitute therefor -- to the --

Signed and Sealed this

Eleventh Day of May, 2004

JON W. DUDAS
*Acting Director of the United States Patent and Trademark Office*